United States Patent [19]

Sturwold et al.

[11] 4,107,061
[45] Aug. 15, 1978

[54] AMINO-AMIDE LUBRICANTS DERIVED FROM POLYMERIC FATTY ACIDS AND POLY(OXYETHYLENE) DIAMINES

[75] Inventors: Robert J. Sturwold; Mark A. Williams, both of Cincinnati, Ohio

[73] Assignee: Emery Industries, Inc., Cincinnati, Ohio

[21] Appl. No.: 848,848

[22] Filed: Nov. 7, 1977

[51] Int. Cl.² .................. C10M 1/06; C10M 3/04; C09F 5/00; C09F 7/00
[52] U.S. Cl. .................................... 252/49.3; 72/42; 252/51.5 A; 252/392; 260/404.5
[58] Field of Search ............ 72/42; 252/49.3, 51.5 A, 252/392; 260/404.5 EO

[56] References Cited

U.S. PATENT DOCUMENTS

| | | | |
|---|---|---|---|
| 3,563,927 | 2/1971 | Kamen et al. | 260/404.5 EO |
| 3,804,763 | 4/1974 | Meinhardt | 252/51.5 A |
| 4,062,820 | 12/1977 | Mitchell et al. | 260/404.5 EO |

*Primary Examiner*—Irving Vaughn
*Attorney, Agent, or Firm*—Gerald A. Baracka; John D. Rice

[57] ABSTRACT

Amino-amides obtained by the reaction of polymeric fatty acids with poly(oxyethylene) diamines are readily compatible with water in all proportions and form clear, aqueous solutions which have excellent lubricating properties.

11 Claims, No Drawings

AMINO-AMIDE LUBRICANTS DERIVED FROM POLYMERIC FATTY ACIDS AND POLY(OXYETHYLENE) DIAMINES

BACKGROUND OF THE INVENTION

Esters derived from polymeric fatty acids obtained by the dimerization of unsaturated fatty acids are known and widely used as synthetic lubricants. Products of this type are described in U.S. Pat. Nos. 2,767,144 and 3,223,635. Even though esters and polyesters having excellent lubricating properties are obtained from the reaction product of dimer acid and glycols, the compatibility of these products with water is generally poor. This is of little consequence if the lubricant is to be employed with a petroleum or synthetic lubricating base stock, however, for many metal working applications it is highly desirable to utilize the lubricant in an aqueous system.

Dimer-based synthetic ester lubricants having increased hydrophilic character, i.e. which exhibit a marked affinity for water, have been developed. U.S. Pat. No. 3,492,232, for example, discloses ester lubricants derived from polyoxyalkylene glycol and a polymeric fatty acid. While these lubricants can be employed as aqueous metal working lubricants and represent an advance in the art, they are not without certain disadvantages. Aqueous emulsions of these products are not completely stable and undergo partial phase separation in short periods of time. If stable emulsions are to be obtained, the use of external emulsifying agents is necessary.

Further improved lubricants derived from polyoxyalkylene glycols and polymeric fatty acids are disclosed in U.S. Pat. No. 3,769,215. The emulsifiability of the synthetic lubricant product and stability of the resulting aqueous emulsions is enhanced by incorporating a short-chain dibasic acid in the ester. It is thus possible to form stable aqueous emulsions of these synthetic ester lubricants without the use of external emulsifying aids and, even more unexpectedly, some of these ester lubricants are completely soluble in water so that clear, homogeneous lubricant solutions can be prepared. While the ester lubricants of U.S. Pat. No. 3,769,215 and aqueous emulsions and solutions thereof are extremely useful and exhibit a high degree of lubricity, they have little or no rust preventive ability. These problems can be overcome by the additives of suitable additives but not without some sacrifice in the other desirable properties of the system and additional cost to the formulator.

It would be highly desirable, therefore, if dimer-based synthetic lubricants exhibiting rust preventive character and enhanced lubrication properties, particularly improved extreme pressure properties, were available. It would be even more advantageous if these dimer-based lubricant compositions could be obtained without adversely affecting the hydrophilic character of the polymer so that stable aqueous lubricant systems could be prepared. These and other advantages are possible with the improved lubricant compositions of this invention.

SUMMARY OF THE INVENTION

We have now quite unexpectedly discovered that amino-amides derived from polymeric fatty acids (dimer acids) and poly(oxyethylene) diamines are excellent synthetic lubricants and exhibit the aforementioned desired properties. The amino-amides of this invention are hydrophilic and readily compatible with water in all proportions to form clear, aqueous lubricating solutions. Aqueous lubricating solutions containing the amino-amides of this invention have superior extreme pressure properties and exhibit rust preventive properties not heretofore possible with water soluble dimer-based lubricants.

To obtain the amino-amide products of this invention, a polymeric fatty acid, preferably a dimer acid obtained by the dimerization of an unsaturated $C_{18}$ monocarboxylic acid, is reacted with a poly(oxyethylene) diamine. Useful diamines will have an average molecular weight between about 500 and 1,000. About 1.7 to 2.3 equivalents of the poly(oxyethylene) diamine is reacted per equivalent dicarboxylic acid. Optionally, a short-chain dicarboxylic acid having from 2 to 16 carbon atoms can be included in the reaction. Short-chain saturated aliphatic dicarboxylic acids having from 6 to 12 carbon atoms are preferably employed for this purpose. The resulting amino-amides are compatible with water in all proportions but will typically constitute from about 0.1 to about 40 weight percent of the aqueous lubricant solution.

DETAILED DESCRIPTION

The amino-amide lubricants of this invention are obtained by the reaction of a polymeric fatty acid, preferably dimer acid, with a poly(oxyethylene) diamine. Optionally, a short-chain dicarboxylic acid may be included in the reaction. Since the reactants are all difunctional, a complex mixture of compounds including amino-amides, poly(amino-amides) and partial amides of the diamine and acid will be obtained. This is not detrimental, in fact, this feature may be partially responsible for the improved properties observed with these products.

The polymeric fatty acids used for this invention are obtained by the polymerization of olefinically unsaturated monocarboxylic acids containing 16-20 carbon atoms, such as oleic acid, linoleic acid, linolenic acid, eleostearic acid and the like. Dicarboxylic acids produced in this manner, that is, by the addition of two moles of the monocarboxylic acid, are referred to as dimer acids and are particularly useful for the preparation of the amino-amide lubricant products. Processes for the production of dimer acids are well known and by way of illustration reference may be had to U.S. Pat. Nos. 2,793,219 and 2,955,121. $C_{36}$ dimer acids obtained by the dimerization of unsaturated $C_{18}$ acids such as oleic acid, linoleic acid, or mixtures thereof (e.g. tall oil fatty acids) are especially useful and advantageously employed for this invention. Such dimer acids have as their principle component a $C_{36}$ dicarboxylic acid and typically have an acid value in the range 180–215, saponification value in the range 190–205 and neutral equivalent from 265–310. Dimer acids containing less than 30% by weight by-product acids, including monobasic acids, trimer acids or higher polymeric acids are particularly useful. The dimer acid can be molecularly distilled or otherwise purified to increase the $C_{36}$ dimer content to 90% by weight or more. It may also be advantageous to hydrogenate or partially hydrogenate the dimer acid prior to use.

In addition to the above-described polymeric fatty acids, other high molecular weight dicarboxylic acids are also suitable for the preparation of amino-amides of this invention. For example, dicarboxylic acids such as are obtained by the ozonolysis of $\alpha,\Omega$-unsaturated hydrocarbons or other di- or multiolefinic materials or by the catalytic oxidation of saturated and/or unsaturated hydrocarbons can be utilized. Useful dicarboxylic acids can also be obtained by the oxidation of methyl- or formyl-branched acids such as isosteric acid or formyl-stearic acid. Carboxystearic acids, such as heptadecane-1,9-dicarboxylic acid or heptadecane-1,8-dicarboxylic acid, as well as other isomeric acids, are produced in this manner. Useful dibasic acids can also be formed by the addition of acrylic acid or methacrylic acid to a monocarboxylic acid containing conjugated unsaturation (e.g. linoleic acid). These polybasic acids can constitute the entire dicarboxylic acid charge or they can be substituted for a portion of the polymeric fatty acid charge.

Poly(oxyethylene) diamines reacted with the polymeric fatty acid will correspond to to the general formula:

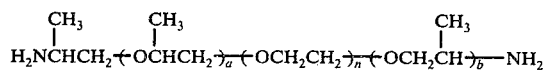

where the sum of $a + b$ is between 1 and 5 and $n$ is a positive integer such that the average molecular weight of the poly(oxyethylene) diamine is between about 500 and 1,000. More preferably, $n$ will be an integer such that the average molecular weight is in the range of 600 to 900. Especially useful and commercially available products are those where $a+b$ is between 3 and 4 and $n$ is an integer from 12 to 22.

To obtain amino-amides having excellent lubricating properties and soluble in water in all proportions 1.7 to 2.3 equivalents poly(oxyethylene) diamine is reacted per equivalent dicarboxylic acid. Particularly useful lubricants are prepared from 1.8 to 2.2 equivalents poly(oxyethylene) diamine per equivalent dicarboxylic acid. It is not necessary that the total carboxyl content be obtained from the polymeric fatty acid. One or more short-chain saturated aliphatic dicarboxylic acids containing from about 2 to 16 carbon atoms can be employed with the polymeric fatty acid. Preferably, the short-chain dicarboxylic acid(s) will contain between 6 and 12 carbon atoms. Adipic acid, azelaic acid, sebacic acid and dodecanedioic acid are especially useful for this purpose. Whereas the short-chain dibasic acid can constitute up to about 70% based on the total equivalents of acid present, more usually, the short-chain dibasic acid will constitute 50% or less of the total acid equivalents.

The amino-amides of this invention obtained by reacting the above-defined compounds in the prescribed equivalent ratios readily form clear, aqueous lubricating solutions useful for metal working. In addition to imparting excellent lubricating properties to the aqueous system, the amino-amides inhibit the formation of rust on ferrous metals treated with the aqueous lubricant solution. The amino-amides of this invention will generally be characterized by having an acid value (ASTM D 1980-67) of 10 or below, 210° F viscosity (ASTM D 445-72) between about 50 and 200 centistokes and a flash point (ASTM D 92-66) above 500° F. Also, the products will typically have a pour point (ASTM D 97-57) between about 5° F and 30° F.

The amino-amides of this invention are obtained using conventional condensation procedures known to the art for reacting dicarboxylic acids with amines. Typically, all the reactants are charged to the reactor with or without catalyst and heated at a temperature from about 140° C to 250° C while removing water of reaction. More usually the reaction is conducted at a temperature of about 50° C to 220° C. The heating is terminated when the theoretical amount of water is evolved and the product has the desired amine and acid values. Generally, several hours are required to complete the reaction. It is not necessary that a catalyst be employed, however, known catalysts can be employed to promote the reaction if desired. The reaction is generally conducted under an inert atmosphere, such as nitrogen, and during the final stages a vacuum is applied to the system to facilitate removal of the final traces of water and other volatile materials which may be present.

While highly useful amino-amide lubricants are obtained from the reaction of the dimer and poly(oxyethylene) diamine, and optionally a short-chain dibasic acid, small amounts and other compounds capable of reacting may also be included in the condensation reaction. For example, aromatic dibasic acids, diols and polyols, polyoxyalkylene glycols, diamines and polyamines can be present in amounts which do not interfere with the reaction or detract from the overall properties of the lubricant, i.e. lubricity, compatability with water, rust inhibiting properties and the like. The amount of these additional compounds will generally not exceed 10% by weight, based on the total weight of the composition, and more preferably, will constitute 5% or less of the total weight.

The amino-amide lubricants of this invention are useful for metal working applications. They can be employed with both ferrous and non-ferrous metals. Typical of the metal working operations included within the scope of this invention are rolling, forging, hot pressing, blanking, bending, stamping, drawing, cutting, drilling, punching and the like. All of these operations are known in the metal working art and the desirability of utilizing aqueous lubricant solutions in these operations is also well established.

The amino-amide can be present in the aqueous lubricating solution by itself or may be employed in combination with other water soluble or water emulsifiable lubricating compositions. Additionally, there may also be present other additives such as stabilizers, emulsifiers, corrosion inhibitors, fungicides, bacteriocides or the like. Even though the amino-amide is compatible with water in all proportions, it usually constitutes from about 0.1 to about 40 weight percent of the aqueous lubricant solution. More preferably, from about 0.5 to 20 weight percent of the amino-amide will be present in the aqueous lubricating system. The resulting aqueous solutions are stable and do not separate or become cloudy upon standing.

Aqueous lubricating compositions containing the amino-amides of this invention can be applied to the metals to be worked in any manner which insures the formation of a continuous lubricating film at the point of operation. This minimizes friction and heat build-up, speeds up the operation and reduces wear of the metal working elements. The lubricant can be brushed or sprayed into the metal or the metal can be immersed in a bath containing the lubricant. In rolling operations, the lubricant can be applied to the metal working elements.

The aqueous lubricants are useful with a wide variety of metals, including both ferrous and nonferrous metals and their alloys. They can be employed for working nonferrous metals such as aluminum, copper, manganese, titanium, brass and bronze or with other metals of this type which are susceptible to staining. They are particularly useful, however, with ferrous metals where the development of rust is a particular problem. In the past, using known dimer-based lubricants emulsifiable or soluble in water, it was necessary to employ an external corrosion inhibitor to inhibit rust formation. Using the amino-amide of this invention, however, it has quite unexpectedly been discovered that aqueous solutions of these products inherently possess rust inhibiting characteristics so that the use of external corrosion inhibitors is not necessary for most applications. In addition to this improvement, it has also been found that the resulting lubricants exhibit significantly improved extreme pressure properties as compared to heretofore known water soluble lubricating compounds. This feature is especially advantageous and desirable for high-speed rolling operations.

These and other advantages of the above-described amino-amide lubricants will be evident from the following examples. In these examples, all parts and percentages are on a weight basis unless otherwise indicated.

EXAMPLE I

To a glass reactor equipped with a stirrer, thermometer, nitrogen inlet and recycle trap equipped with a water-cooled condenser were charged 194.0 grams (1 equivalent) dimer acid (EMPOL ® 1018 Dimer Acid containing 83% $C_{36}$ dibasic acid) and 408 grams poly(oxyethylene) diamine having an average molecular weight of about 600. The reaction mixture was then slowly heated over a two hour period with agitation under an atmosphere of nitrogen to 210° C while removing water of reaction. The reaction temperature was then maintained at 210° C for an additional four hours until the theoretical amount of water was collected. Heating was terminated at this point and the clear viscous product discharged from the reactor.

The amino-amide product had the following properties:

| | |
|---|---|
| Acid Value | 0.85 |
| Amine Value | 56.7 |
| 210° F Viscosity | 114.4 centistokes |
| 100° F Viscosity | 1718.1 centistokes |
| Pour Point | + 15° F |
| Flash Point | 555° F |
| Fire Point | 595° F |

Lubrication properties of the above-prepared amino-amide product were determined using the Falex machine (modified ASTM D 2670-76). The Falex test provides a convenient and reliable means to determine the film strength and load carrying properties of lubricants as extreme pressures are applied. The Falex test is recognized throughout the industry as a means of determining the relative effectiveness of lubricants for metal working. For the test, 600 mls of a 5% aqueous solution of the amino-amide is employed. The standard steel pin and V-block assembly are completely immersed in the sample and the loading device attached. The machine is started and a load of 300 lbs. applied for the initial 5 minute warm-up period. After this time, the load is increased to 700 lbs. and maintained for 15 minutes. The difference between the readings taken at the beginning and the end of the 15 minute period is recorded as the units of wear. Eleven units wear was obtained with the aqueous lubricant solution. The extreme pressure properties are determined by increasing the load in 250 lb. increments (up to a maximum of 4,500 lbs.) at 1 minute intervals until the pin fails. The last load reading before failure is reported. This is convenient means to measure the ability of the product to withstand extreme pressures. The aqueous lubricant solution prepared with the amino-amide of this example withstood the maximum load of 4,500 lbs. without failure.

The amino-amide product was also evaluated in a rust test. For this test, a small amount of cast iron fillings is placed on a filter paper covering the bottom of a 4" Petri dish. Aqueous lubricant solution (5%) is added so that the cast iron fillings are partially immersed. The amount of rust developed under ambient conditions is visually rated (no visible rust, slight, moderate, or heavy) after 1 hour and again after 2 hours. A control containing no lubricant developes heavy rust within 15 to 30 minutes whereas the lubricant solution prepared with the amino-amide of this example showed only a slight trace of rust even after 2 hours.

EXAMPLE II

To demonstrate the ability to use a short-chain dibasic acid with the dimer acid the following experiment was conducted. For this example, the amino-amide was prepared in accordance with the procedure of Example I except that two equivalents of the poly(oxyethylene) diamine, 0.5 equivalent dimer acid and 0.5 equivalent adipic acid were charged. The resulting amino-amide product had an acid value of 1.7 and an amine value of 64 and formed clear lubricant solutions when combined with water. A 5% aqueous solution of the product was evaluated in the rust test and showed only slight rust development after two hours. In the Falex test, the aqueous lubricant solution gave only 11 units wear and withstood 4,500 lbs. without failure in the extreme pressure cycle.

EXAMPLE III

To further demonstrate the versatility of the amino-amides of this invention, Example I was repeated using a poly(oxyethylene) diamine having an average molecular weight of about 900. The final product, which was a semi-solid at room temperature, had an acid value of 1.28, amine value of 42.1 and was readily compatible with water to form clear lubricating solutions. A 5% aqueous lubricating solution prepared therefrom developed only moderate rusting in the rust test after 2 hours. When evaluated in the Falex test, only 25 units wear was registered after the initial 15 minute test cycle and the product withstood 3,500 lbs. in the extreme pressure test.

EXAMPLE IV

Example I was repeated employing $C_{21}$ dibasic acid obtained by the addition of acrylic acid and linoleic acid at an equivalents ratio of 1:2. The reaction was conducted in the usual manner. After about 7 hours the theoretical amount of water was evolved and the heating terminated. The resulting amino-amide had an acid value of 6.78, amine value of 73.8 and formed clear, aqueous lubricating solutions exhibiting resistance to rust formation and good lubricating properties. In the rust test, only moderate rusting was observed after 2 hours using a 5% aqueous lubricant solution. This same aqueous lubricant gave only 25 units wear and withstood 4,500 lbs. in the Falex test.

EXAMPLE V

An amino-amide prepared employing a mixture of dimer acid (0.5 equivalent) and a short-chain dibasic acid (0.5 equivalent) and a poly(oxyethylene) diamine glycol having an average molecular weight of 400 was also included in the reaction. The final product had an acid value of 1.21, an amine value of 45.2 and formed clear solutions when mixed with water in all proportions. A 5% aqueous solution of this product evaluated in the rust test showed no sign of rust after two hours. The aqueous lubricating solution gave 30 units wear in the Falex test and withstood the maximum load of 4,500 lbs. without failure.

EXAMPLE VI

To demonstrate the superiority of the amino-amide lubricant products of this invention as compared to heretofore known emulsifiable and water soluble dimer-based lubricant compositions the following comparative example is provided. For this experiment, an ester lubricant was prepared in accordance with Example I of U.S. Pat. No. 3,769,215 by reacting 0.9 equivalent dimer acid containing 83% $C_{36}$ dibasic acid, 0.1 equivalent azelaic acid and 2 equivalents polyoxyethylene glycol having an average molecular weight of 400. The resulting ester product was readily compatible with water and a 5% stable aqueous emulsion was prepared. Also, in accordance with Example III of the same U.S. patent, a water-soluble ester lubricant was obtained by reacting 0.4 equivalent of the dimer acid with 0.6 equivalent adipic acid and 2 equivalents of the polyoxyethylene glycol. This product was compatible with water in all proportions and formed clear solutions. Five percent aqueous solutions of the emulsifiable ester product and water soluble ester product were evaluated in the rust test and heavy rusting was observed with both after only 60 minutes. There was no evidence of rust formation after 60 minutes using a 5% aqueous lubricant prepared using the amino-amide of Example I. The aqueous lubricants formed with these esters were also evaluated for their lubricating ability in the Falex test and both gave significant wear (30-35 units) during the 15 minute test cycle as compared to the amino-amide lubricant of Example I. Also, both of these ester had poorer extreme pressure properties than obtained with the amino-amide lubricant. Failure was obtained at loads of 3,750 lbs. or less with aqueous lubricants prepared using the esters whereas with the 5% aqueous amino-amide lubricant of Example I failure was not obtained even up to the maximum loading 4,500.

We claim:

1. Amino-amide compositions comprising the reaction product of a poly (oxyethylene) diamine of the general formula

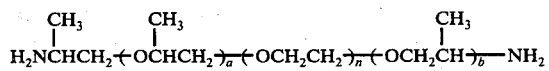

where the sum of $a+b$ is between 1 and 5 and $n$ is a positive integer such that the average molecular weight is between about 500 and 1,000 and a polymeric fatty acid, said respective reactants employed at an equivalents ratio of 1.7-2.3:1.

2. The amino-amide composition of claim 1 wherein the product is further characterized by having an acid value of 10 or below, 210° F viscosity between about 50 and 200 centistokes and flash point greater than 500° F.

3. The amino-amide of claim 1 wherein the poly(oxyethylene) diamine has a molecular weight in the range 600 to 900 and the polymeric fatty acid is obtained by the polymerization of a $C_{18}$ unsaturated monocarboxylic acid.

4. The amino-amide composition of claim 3 wherein the equivalents ratio of poly(oxyethylene) diamine to the polymeric fatty acid is 1.8-2.2:1.

5. The amino-amide composition of claim 4 wherein the polymeric fatty acid is a dimer acid containing 70% or more $C_{36}$ dibasic acid.

6. The amino-amide composition of claim 3 having reacted therein up to about 70%, based on the total acid equivalents, of a short-chain saturated aliphatic dicarboxylic acid having from 2 to 16 carbon atoms.

7. The amino-amide composition of claim 6 wherein the short-chain dicarboxylic acid is selected from the group consisting of adipic acid, azelaic acid, sebacic acid and dodecanedioic acid.

8. The amino-amide composition of claim 7 wherein the short-chain dibasic acid contains from 6 to 12 carbon atoms and constitutes 50% or less of the total acid equivalents.

9. An aqueous lubricant composition suitable for metal working containing about 0.1 to 40 weight percent of an amino-amide composition derived from a polymeric fatty acid and a poly(oxyethylene) diamine of the general formula:

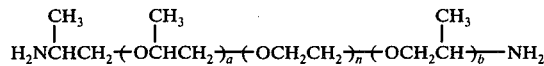

where the sum of $a+b$ is between 1 and 5 and $n$ is a positive integer such that the average molecular weight is between 500 and 1,000 and reacted at an equivalents ratio of 1:1.7-2.3.

10. The aqueous lubricant composition of claim 9 wherein the amino-amide constitutes 0.5 to 20 weight percent of the solution, the polymeric fatty acid is a dimer acid obtained by the polymerization of a $C_{18}$ unsaturated monocarboxylic acid and contains 70% or more $C_{36}$ dibasic acid and the poly(oxyethylene) diamine has a molecular weight in the range 600 to 900.

11. The aqueous lubricant composition of claim 10 wherein the amino-amide has reacted therein up to about 70%, based on the total acid equivalents of a short-chain saturated aliphatic dicarboxylic acid having 2 to 16 carbon atoms.

* * * * *